United States Patent Office 2,759,638
Patented Aug. 21, 1956

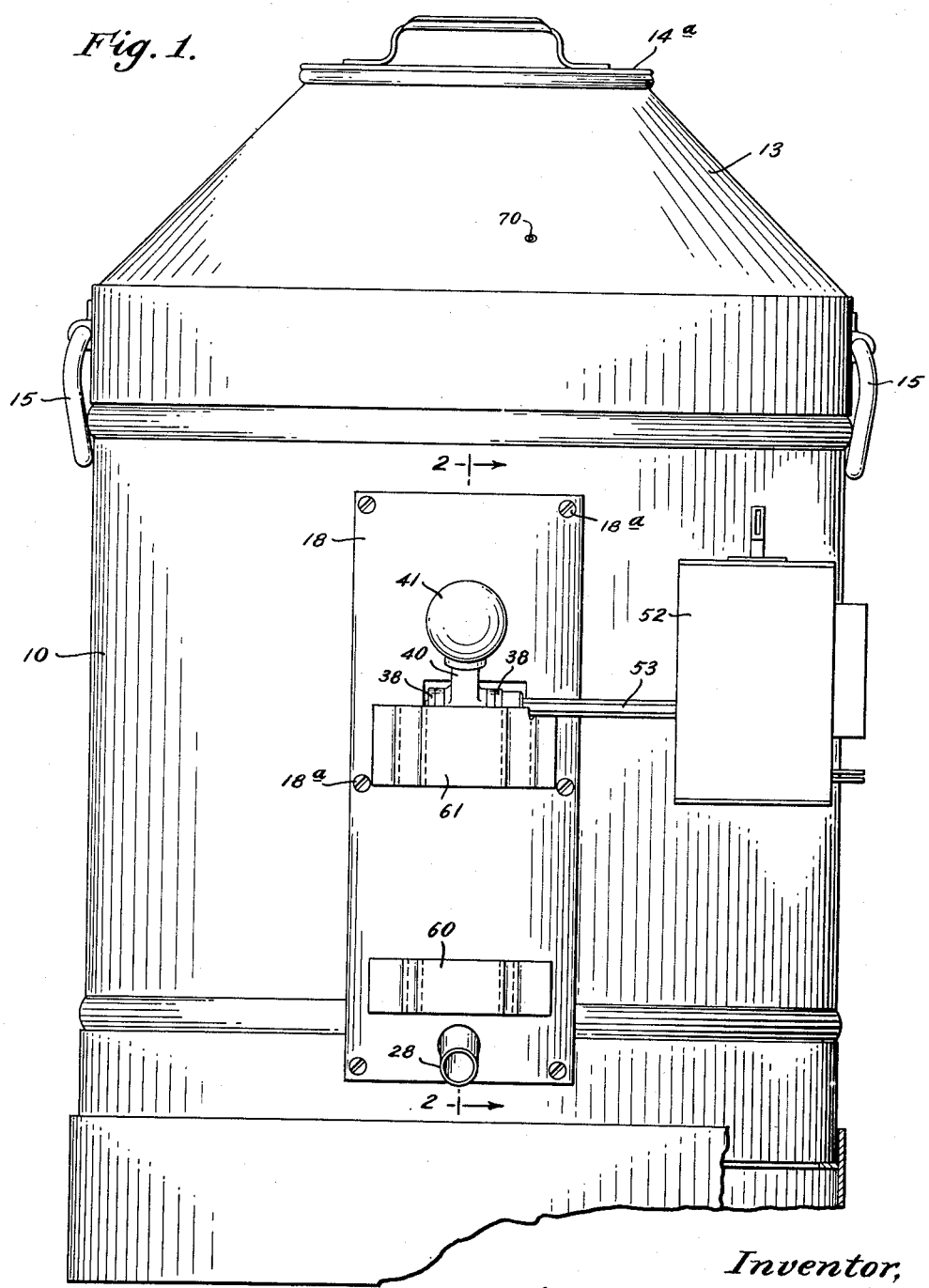

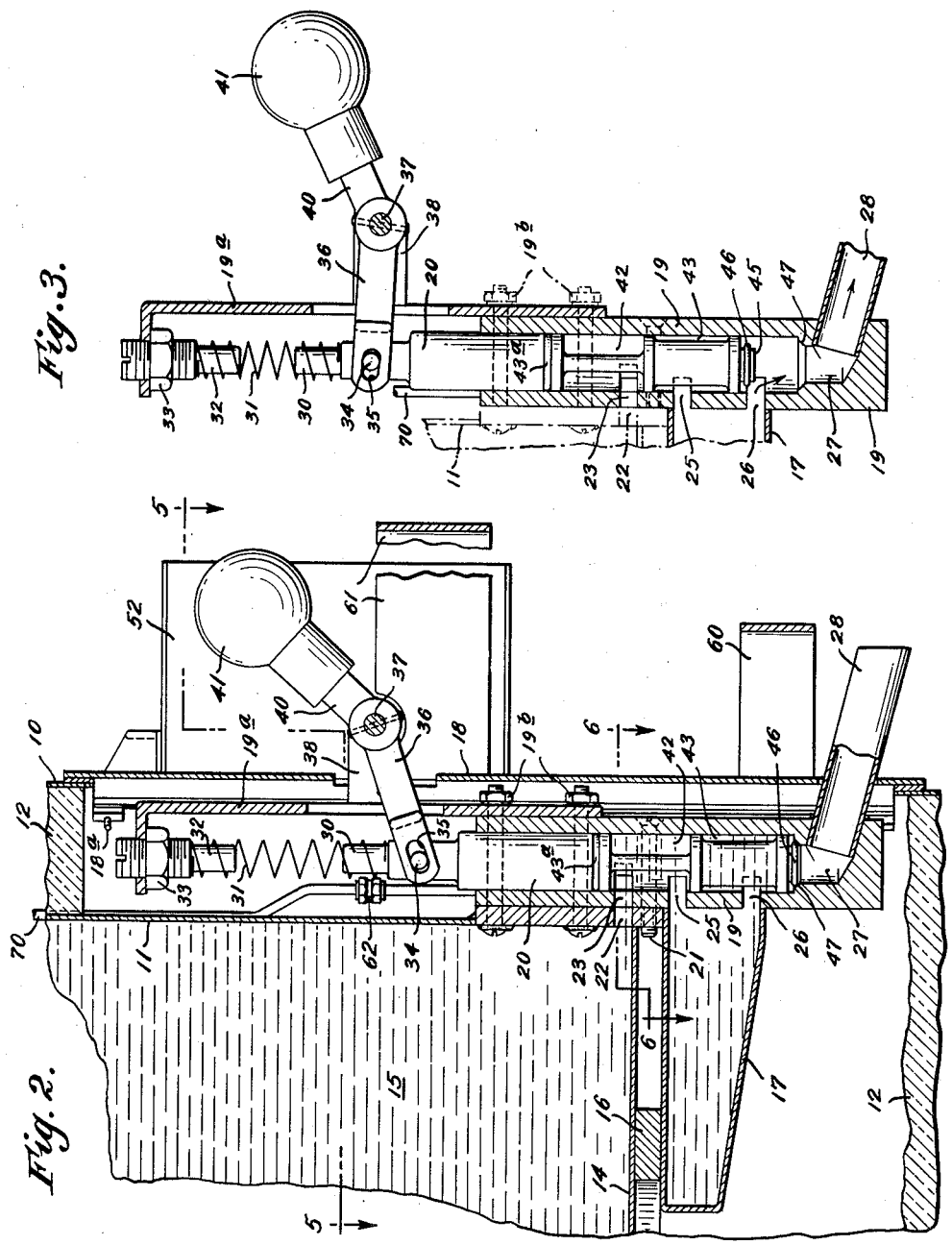

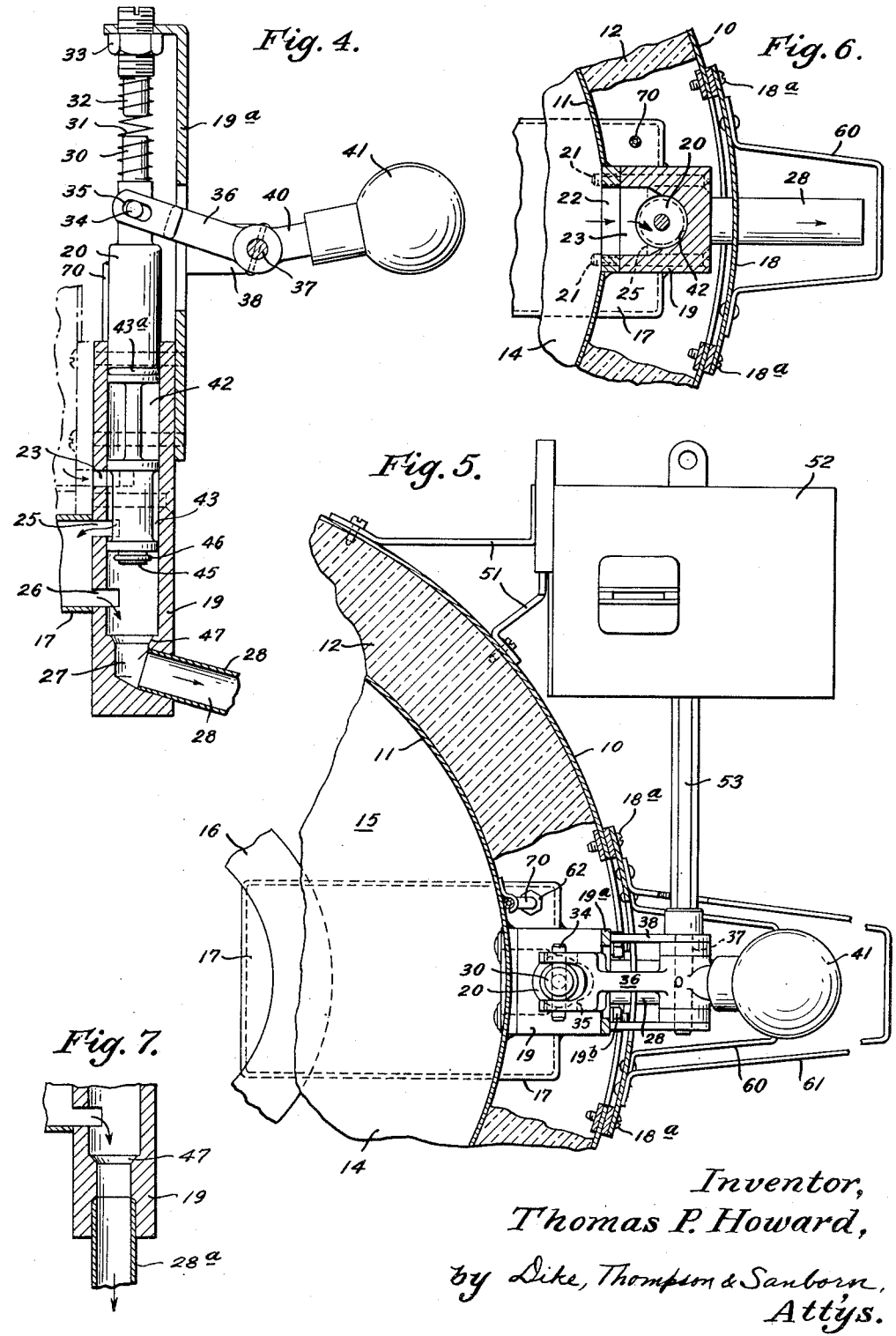

2,759,638

APPARATUS FOR DISPENSING LIQUIDS

Thomas P. Howard, Ashland, Mass., assignor to Abraham Runstein, Newton, Mass.

Application December 28, 1954, Serial No. 478,103

8 Claims. (Cl. 222—146)

The present invention has to do with apparatus for dispensing liquids, for example, an apparatus for dispensing hot coffee and it is suitable for use with a coin-controlled mechanism to deliver an accurately measured amount, for instance, a cupful. The apparatus shown in the drawings may be used wherever it is desired to keep on hand a constant supply of liquid, for instance, coffee, and to serve it in accurately measured amounts. Such a device must be proof against tampering and must be constructed to deliver liquid of the desired temperature instantly and not for example at first a cool or tepid beverage and then hot liquid. Such apparatus preferably is so constructed that it can be kept clean and sterile with a minimum amount of work.

In the apparatus embodying the present invention a single valve member is employed and therefore the mechanism is not likely to get out of order even when subjected to the rough usage to which such devices are often subjected. This valve member may be placed in three positions. In the first or closed position, the hot coffee or other liquid flows from a main reservoir into a measuring reservoir which with certain associated cavities holds the precise amount desired for each delivery, for example a cup full; in the second or discharge position communication between the main reservoir and the measuring reservoir is closed so that no liquid can flow into the measuring reservoir from the main reservoir and the discharge port of the measuring reservoir is opened allowing the contents of the measuring reservoir to be discharged into a cup; and in the third or flushing position all of the ports are opened so that water or cleansing fluid can be poured through the apparatus passing first into the main reservoir, then through the valve mechanism into the measuring reservoir and finally out the discharge port thus flushing the entire system.

The valve mechanism is completely enclosed within an outer casing or jacket where it cannot be tampered with, and with the measuring reservoir is constructed to form a single unit which may be removed and then taken apart so that every part may be thoroughly cleaned and if necessary scrubbed.

The valve mechanism is such that when closed the discharge is doubly sealed, reducing wasteful and objectionable drip to a minimum or completely preventing it. Being simple, an apparatus embodying the present invention is economical to manufacture.

Other objects and advantages will be apparent from a consideration of the following description and the accompanying drawings in which:

Fig. 1 is a front elevation of an apparatus embodying the invention.

Fig. 2 is a section on the line 2—2 of Fig. 1, the parts being shown with the discharge port in closed position.

Fig. 3 is a partial section on the line 2—2 of Fig. 1, but with the parts shown in the discharge position, the parts shown in full lines in this view constituting a removable unit.

Fig. 4 is a view similar to Fig. 3, but with the parts shown in the flushing position.

Fig. 5 is a section of line 5—5 of Fig. 2, looking down.

Fig. 6 is a section on line 6—6 of Fig. 2, looking down.

Fig. 7 is a partial vertical section of the lower end of another embodiment of the valve casing but with the discharge spout arranged to discharge in a vertical direction rather than at an angle to the vertical.

At 10 (see Figs. 1 and 5) is shown the outer wall of the apparatus and at 11, the side wall of the main reservoir. The space between these two walls is filled with any suitable type of heat insulation material 12. The apparatus conveniently has a consical top, 13, closed by a cover 14a, and it may be supplied with handles 15.

At 14, see Fig. 2, is shown a bottom plate which with the side wall 11, forms the main reservoir 15. Located below the bottom plate 14 is an electric heating unit 16. This is conveniently of horseshoe or annular shape. Immediately below the heating unit 16, is located the measuring reservoir 17, which with certain connected spaces is designed to contain the desired amount of liquid to be delivered, for instance, a coffee-cupful.

The shell or outer wall 10 of the apparatus is formed with a side opening closed by a plate 18 (Figs. 1, 2 and 5), removably secured to the wall by screws 18a or other suitable means. In the space between the plate 18 and the main reservoir 15 is secured a removable unit shown in full lines in Figs. 3 and 4 which includes a valve casing 19, a piston valve 20, which will be described in more detail hereafter, and the measuring reservoir 17 and certain other parts which will be described hereafter. The valve casing 19, is secured to the main reservoir by two screws 21 one of which is seen in Fig. 2.

At the bottom of the main reservoir 15 is a port 22 affording communication with the port 23 in the valve casing 19. The valve casing 19 has another port 25 somewhat lower down which provides communication between the interior of the valve casing and the interior of the measuring reservoir 17. Still lower down there is a port 26 in the valve casing which provides communication between the interior of the valve casing and the bottom of the measuring reservoir. In the preferred form of the invention the valve casing 19 has a discharge opening or port 27 concentric with the axis of the valve body and communicating with a discharge conduit 28 which projects outwardly from the valve casing and through the removable plate 18.

The piston valve 20 is provided at its upper end with a stem 30, around which is a coil spring 31, the upper end of which surrounds the lower end of the screw threaded stud 32, adjustably secured in place by a nut 33. On the stem 30 is a pair of pins 34, extending horizontally and engaging a slot 35 in the lever arm 36. This lever arm 36 is pivoted at 37 between the brackets 38 secured to a piece 19a which is fastened to the valve casing 19 by the bolts 19b. The lever arm 36 is integral with another arm 40 on which is mounted a handle or knob 41. When this knob is moved downwardly the free end of the arm 36 is elevated thus raising the piston valve 20 and compressing the spring 31.

The piston valve 20 is provided with two portions 42 and 43 of reduced diameter or cross section which provide longitudinally communicating passages extending between the various ports depending upon the vertical position of the piston valve. To make sure that there is no leakage upward past the piston valve 20 a sealing ring 43a is provided above the reduced diameter 42. At the lower end of the piston valve 20 another sealing ring 46 is provided and it contacts the valve seat 47 formed on the interior of the valve casing when the valve is in its lowermost position as shown in Fig. 2. In this position flow of liquid from the measuring reservoir 17 into the discharge conduit 28 is cut off.

On the side of the apparatus is placed brackets 51 on which is supported a coin-control mechanism 52. The coin-control mechanism is connected by a hexagonal shaft 53 with the pivot or rod 37 on which the handle 41 is mounted and the coin-controlled apparatus is so arranged that the shaft 53 and consequently the pivot or rod 37 and handle 41 cannot be moved except when the shaft 53 is freed for rotary movement by the introduction of a coin into the coin-controlled mechanism.

The guard 60 of sheet metal protects the projecting spout 28 and the guard 61 protects the handle 41. These guards are so placed that parts of the apparatus are not likely to be injured during handling.

To prevent the measuring reservoir 17 from becoming air-bound a vent pipe 70 is provided which leads from the reservoir 17 up beside the valve casing 19 to a point above the highest level of the contents of the main reservoir 15. The vent pipe 70 may be carried up through the conical top 13 and a removable union 62 is provided so that the pipe can be disconnected when it is desired to take out the removable unit shown in Fig. 2.

In operation of the machine the piston valve 20 is normally in the closed position shown in Fig. 2. At this time the lower end of the piston valve 20 with its sealing ring 46 seats on the valve seat 47 and shuts off all flow of liquid beyond that point, thus allowing the measuring reservoir 17 to fill since at this time the reduced cross section 42 of the piston valve provides communication between the ports 23 and 25 and thus establishes communication between the main reservoir 15 and the measuring reservoir 17. At the same time the reduced portion 43 of the piston valve 20 bridges the port 26 and liquid from the main reservoir 15 may flow through port 22, port 23, reduced portion 42, ports 23 and 25 into reduced portion 43. This flow is by gravity and, because of the vent pipe 70, the cavities are completely filled.

When a coin is inserted in the coin-controlled apparatus 52, shaft 53 is unlocked, and then handle 41 may be pulled down, raising the piston valve 20 to the discharge position shown in Fig. 3. In this position the valve 20 is moved to a position such that the reduced portion 42 bridges port 23 and flow from the main reservoir 15 to the measuring reservoir 17 is thereby cut off. At the same time valve 45 is lifted off its seat 47 and the contents of the measuring reservoir 17 and communicating spaces flows out through the discharge pipe 28 and air enters reservoir 17 through vent pipe 70 and the reservoir is emptied. When the operator lets go of the handle 41, the spring 31 returns the parts to the position shown in Fig. 2 and the measuring reservoir is re-filled from the main reservoir.

When the liquid in the main reservoir is exhausted and it is desired to clean or flush the system, the handle 41 is lowered to the flush position shown in Fig. 4. At this time the reduced portion 42 is raised above port 23 and reduced portion 43 bridges ports 23 and 25 as shown in Fig. 4. Also the lower end of the piston valve 20 is above port 26. Thereupon free passage is established from the main reservoir 15 into the reduced portion 43, thence into measuring reservoir 17, thence through port 26 into the valve casing 19 and finally into the discharge conduit 28. In this position hot water or cleansing fluid can be flowed through the entire apparatus giving it a thorough cleansing.

If a more thorough cleaning than can be produced by flushing is required the entire unit shown in full lines in Figs. 3 and 4 may be removed as previously described, the piston valve 20 and all of the parts thoroughly scrubbed.

Since the heating element 12 is located directly below and in contact with the bottom of the main reservoir 15 and directly above and also in contact with the measuring reservoir 17, a uniform high temperature in both reservoirs can be maintained and therefore the coffee or other liquid as it emerges from the spout 28 will be substantially as hot as the coffee in the main reservoir.

In the embodiment of Fig. 7 the discharge conduit 28a extends vertically downwardly coaxially with the chamber of the valve casing 19 rather than outwardly therefrom as does the conduit 28 in Fig. 4.

While two embodiments of the invention have been shown and described it is to be understood that this disclosure is for the purpose of illustration and that various modifications and changes may be made without departing from the spirit and scope of the invention as set forth in the appended claims.

I claim:

1. A liquid dispensing apparatus comprising a main reservoir, a measuring reservoir beneath the main reservoir, a valve casing having a discharge port near its lower end, said valve casing extending alongside of both of said reservoirs, a piston valve in the valve casing, a main reservoir port connecting the main reservoir and said valve casing, a measuring reservoir port connecting the measuring reservoir and said valve casing, a passage in said valve for providing communication between the main reservoir port and the measuring reservoir port when the valve is in a lowered position wherein it closes the discharge port, whereby by longitudinal movement of said valve in said valve casing communication between the main reservoir and the measuring reservoir is alternately provided and cut off and communication between the measuring reservoir and the discharge port is provided when communication between the main reservoir and the measuring reservoir is cut off.

2. Apparatus as defined in claim 1 also comprising a heating element disposed between the main reservoir and the measuring reservoir.

3. Apparatus as defined in claim 1 also comprising means for securing the measuring reservoir to the valve casing and means for detachably securing the valve casing to the main reservoir whereby the valve casing and the measuring reservoir may be removed as a unit.

4. A liquid dispensing apparatus comprising a main reservoir, a measuring reservoir beneath it, a valve casing extending alongside of both reservoirs, a main reservoir port connecting the interior of the valve casing and the bottom of the main reservoir, a top measuring reservoir port connecting the top of the measuring reservoir and the interior of the valve casing and a bottom measuring reservoir port connecting the bottom of the measuring reservoir and the interior of the valve casing, and a discharge port near the lower end of the valve casing, a piston valve in said valve casing movable into three positions in the lowest position of which the discharge port is closed by the lower end of the piston valve and the bottom measuring reservoir port is closed by the side of the piston valve, in the intermediate position of which the top measuring reservoir port is connected with the main reservoir port, and in the highest position of which all four ports are open and communication is provided from the main reservoir past the piston valve through the measuring reservoir and out through the discharge port in the valve casing.

5. A liquid dispensing apparatus comprising a main reservoir, a measuring reservoir beneath it, a valve casing extending alongside both reservoirs and having a cylindrical bore with an open lower end forming a discharge port and three lateral ports one of which opens into the main reservoir and the other two into the measuring reservoir, a unitary valve slidable in said bore and having three piston members separated by two portions of reduced cross sections, the upper of said piston members cooperating with the port leading into the main reservoir and the other two piston members cooperating with the ports opening into the measuring reservoir, and the lower end of the valve acting to open and close the discharge port, said valve being movable into three positions in the lowest of which the discharge port is closed by the lower end of the valve and the bottom port of the measuring reservoir is closed by the lower piston member, in the intermediate position of which the top port of the measuring reservoir is connected with the port opening into the main reservoir by the space between the two piston members, and in the highest position of which all four ports are open and communication is provided from the main reservoir past the valve through the measuring reservoir and out through the discharge port.

6. A dispensing device for liquids including a main reservoir having a port on the side at the bottom thereof, a valve casing, a piston valve therein, a measuring reservoir adjacent to the valve casing, said valve casing having a port affording communication between the main reservoir and the valve casing, a top measuring reservoir port affording communication between the measuring reservoir and the valve casing, a bottom measuring reservoir port affording communication between the measuring reservoir and the valve casing, said piston valve having two portions of reduced cross section, the upper of which bridges the main reservoir port and the top measuring reservoir port when the valve is in a lowered position and the lower of which bridges the main reservoir port and the top measuring reservoir port when the valve is in a raised position.

7. A device as defined in claim 6 also comprising a heating element disposed between the main reservoir and the measuring reservoir.

8. Apparatus as defined in claim 6 also comprising means for securing the measuring reservoir to the valve casing and means for detachably securing the valve casing to the main reservoir whereby the valve casing and the measuring reservoir may be removed as a unit.

References Cited in the file of this patent
UNITED STATES PATENTS

| | | |
|---|---|---|
| 1,271,840 | Billings | July 9, 1918 |
| 1,708,184 | Markus | Apr. 9, 1929 |
| 2,568,474 | Van Sciver | Sept. 18, 1951 |